(12) United States Patent
Hodoya et al.

(10) Patent No.: US 9,878,603 B2
(45) Date of Patent: Jan. 30, 2018

(54) VEHICLE DOOR IMPACT BEAM

(71) Applicants: AISIN SEIKI KABUSHIKI KAISHA, Kariya-shi, Aichi-ken (JP); AISIN KEIKINZOKU KABUSHIKI KAISHA, Imizu-shi, Toyama-ken (JP)

(72) Inventors: Kohei Hodoya, Kariya (JP); Tatsuya Tsukamoto, Toyohashi (JP); Tamaki Obayashi, Toyama (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 0 days.

(21) Appl. No.: 15/166,298

(22) Filed: May 27, 2016

(65) Prior Publication Data
US 2016/0347154 A1   Dec. 1, 2016

(30) Foreign Application Priority Data

May 28, 2015 (JP) .................................. 2015-108955
Nov. 9, 2015 (JP) .................................. 2015-219394

(51) Int. Cl.
*B60J 5/04* (2006.01)
(52) U.S. Cl.
CPC .......... *B60J 5/0444* (2013.01); *B60J 5/0429* (2013.01)
(58) Field of Classification Search
CPC ........ B60J 5/042; B60J 5/0422; B60J 5/0429; B60J 5/0443; B60J 5/0444
USPC .................................. 296/30, 146.6, 187.12
See application file for complete search history.

(56) References Cited

U.S. PATENT DOCUMENTS

| 5,743,588 | A  | * | 4/1998 | Ufrecht | B60J 5/0444 296/146.6 |
| 6,276,105 | B1 | * | 8/2001 | Wycech | B60J 5/0444 293/120 |
| 6,416,114 | B1 | * | 7/2002 | Topker | B60J 5/0443 296/146.6 |
| 2001/0024734 | A1 | | 9/2001 | Yamashita et al. | |
| 2015/0129116 | A1 | * | 5/2015 | Richeton | B60R 19/03 156/180 |

(Continued)

FOREIGN PATENT DOCUMENTS

| JP | 11-48779 | 2/1999 |
| JP | 2001-301462 | 10/2001 |
| JP | 2010-195187 | 9/2010 |

*Primary Examiner* — Jason S Daniels
(74) *Attorney, Agent, or Firm* — Finnegan, Henderson, Farabow, Garrett & Dunner, LLP

(57) ABSTRACT

A vehicle door impact beam disposed between first and second door panels includes: a first grooved portion configured to include a bottom wall portion extending along the first door panel in a predetermined direction, and side wall portions; a second grooved portion disposed a predetermined gap away from the first grooved portion in the width direction, and configured to include a bottom wall portion and side wall portions respectively connected to both end portions of the bottom wall portion in the width direction; and a connection wall portion configured to connect one side wall portion, which is one of the side wall portions of the first grooved portion and positioned on a second grooved portion side, to one side wall portion which is one of the side wall portions of the second grooved portion and positioned on a first grooved portion side.

5 Claims, 9 Drawing Sheets

(56) References Cited

U.S. PATENT DOCUMENTS

2016/0121930 A1\* 5/2016 Brockhoff .............. B60J 5/0444
280/784

\* cited by examiner

FRONT SIDE ←——— VEHICLE FORWARD AND REARWARD DIRECTION ———→ REAR SIDE

FRONT SIDE ←——— VEHICLE FORWARD AND REARWARD DIRECTION ———→ REAR SIDE

VEHICLE DOOR IMPACT BEAM

CROSS REFERENCE TO RELATED APPLICATIONS

This application is based on and claims priority under 35 U.S.C. § 119 to Japanese Patent Applications 2015-108955 and 2015-219394, filed on May 28, 2015 and Nov. 9, 2015, respectively, the entire contents of which are incorporated herein by reference.

TECHNICAL HELD

This disclosure relates to a vehicle door impact beam.

BACKGROUND DISCUSSION

As disclosed in JP 11-48779A (References 1), JP 2001-301462A (Reference 2), and JP 2010-195187A (Reference 3), there is a vehicle door impact beam that is attached to the inside of a vehicle door. When an object collides with a vehicle door, a vehicle door impact beam absorbs the impact applied to the vehicle door, and prevents severe deformation of the vehicle door.

The vehicle door impact beams disclosed in References 1 and 2 are formed into a cylindrical shape. That is, each of the vehicle door impact beams includes an inner wall portion disposed on an inner panel side of a vehicle door, and an outer wall portion disposed on an outer panel side of the vehicle door. The inner wall portion and the outer wall portion are provided to extend in parallel with each other, and face each other. Each of the vehicle door impact beams includes a pair of side wall portions which are formed between the inner wall portion and the outer wall portion and connect the inner wall portion to the outer wall portion. In other words, each of the vehicle door impact beams includes a hollow portion that is surrounded by the inner wall portion, the outer wall portion, and the side wall portions. The vehicle door impact beams are made of aluminum alloy. The vehicle door impact beams are manufactured via extrusion forming.

The vehicle door impact beam disclosed in Reference 3 is provided to extend in a predetermined direction, and is formed into a groove shape that opens toward an inner panel side (refer to FIG. 3B in Reference 3). That is, the vehicle door impact beam includes a bottom wall portion which forms a bottom portion of a groove, and side wall portions which form side portions of the groove. The side wall portions are respectively connected to both end portions of the bottom wall portion in a width direction, and face each other. A flange portion is formed in an inner panel side end portion of each of the side wall portions, and extends toward the outside (the outside of a space surrounded by the bottom wall portion and the side wall portions) of the groove. A recession (grooved portion) is formed in an outer panel side surface of the bottom wall portion, and extends in a longitudinal direction of the bottom wall portion. That is, the recession opens toward an outer panel side (refer to FIG. 3A in Reference 3). The vehicle door impact beam is manufactured by pressing a bar-shaped steel plate.

Since the vehicle door impact beams disclosed in References 1 and 2 are formed into a cylindrical shape, the extrusion speed of an extrusion process is lower than that in a case where a member having an open sectional shape is extruded. It is necessary to perform a step of diagonally cutting both end portions of an extruded intermediately formed member so as to attach nuts, which are used to fix the vehicle door impact beam to a door panel, to the inner wall portion (refer to FIG. 1 in Reference 2).

Typically, an inner space of a vehicle door is narrow. Particularly, portions of a vehicle door (that is, front and rear end portions of the vehicle door), in which front and rear end portions of a vehicle door impact beam are respectively disposed, have small dimensions in a vehicle width direction. Accordingly, as described in Reference 1 or 2, in a case where a vehicle door impact beam is manufactured via extrusion forming, if the dimension of the vehicle door impact beam in the vehicle width direction is set to a small value such that the dimension is adapted to the dimension of spaces of front and rear end portions of a vehicle door in the vehicle width direction, it is necessary to increase the thickness of each wall portion of the vehicle door impact beam so as to ensure sufficient strength of the vehicle door impact beam. For this reason, the vehicle door impact beam has a relatively large weight.

In contrast, the dimension of a space at a location inside the vehicle door in the vehicle width direction, in the vicinity of which an intermediate portion of the vehicle door impact beam is disposed, is wider than those at locations at which the front and rear end portions of the vehicle door impact beam are disposed. First, an intermediately formed member extending straight is manufactured via extrusion forming. The dimension of the intermediately formed member in the vehicle width direction is larger than those of the spaces of the front and rear end portions of the vehicle door in the vehicle width direction. The dimensions of the front and rear end portions of the intermediately formed member in the vehicle width direction are decreased by compressing (pressing) the front and rear end portions of the intermediately formed member in the vehicle width direction. However, in this case, as illustrated in FIG. 15, there is a high possibility that the side wall portions are bent (buckled) inward and a space required to fix nuts becomes lost.

In a case where an object collides with a vehicle door, and a load induced by the collision is applied to the vehicle door impact beam disclosed in Reference 3, as the amount of intrusion (stroke) of the object increases, the vehicle door impact beam deforms in order for an open end side (inner panel side) of the vehicle door impact beam to be opened, and bending rigidity (impact absorbing performance) of the vehicle door impact beam decreases.

SUMMARY

Thus, a need exists for a vehicle door impact beam which is not susceptible to the drawback mentioned above. For easy understanding of this disclosure, a reference sign is put in parenthesis for an element in an embodiment which corresponds to each configuration element of this disclosure; however, the configuration of each configuration element of this disclosure is not limited to that of a corresponding element in the embodiment illustrated by a reference sign.

A feature of an aspect of this disclosure resides in a vehicle door impact beam (10, 10A, 10B, 10C) that is disposed between a first door panel (OP) and a second door panel (IP) of a door (DR) of a vehicle (V), the impact beam including: a first grooved portion (20) configured to include a bottom wall portion (21) which extends along the first door panel in a predetermined direction, and a pair of side wall portions (22, 23) which are respectively connected to both end portions of the bottom wall portion in a width direction, and extend in the predetermined direction, and configured to open toward a second door panel side; a second grooved portion (30) that is disposed a predetermined gap away from the first grooved portion in the width direction, is configured to include a bottom wall portion (31) which extends along the first door panel in the predetermined direction, and a pair of side wall portions (32, 33) which are respectively connected to both end portions of the bottom wall portion in the width direction, and extend in the predetermined direction, and is configured to open toward the second door panel; and a connection wall portion (40) configured to connect one side wall portion (23), which is one of the pair of side wall portions of the first grooved portion and is positioned on a second grooved portion side, to one side wall portion (33) which is one of the pair of side wall portions of the second grooved portion and is positioned on a first grooved portion side, and configured to extend along the second door panel in the predetermined direction. The first grooved portion includes a protrusion (221) that protrudes toward the inside of the first grooved portion from a second door panel side end portion of the other side wall portion (22) of the pair of side wall portions, and that extends in the predetermined direction. The second grooved portion includes a protrusion (321) that protrudes toward the inside of the second grooved portion from a second door panel side end portion of the other side wall portion of the pair of side wall portions, and that extends in the predetermined direction. The first grooved portion, the second grooved portion, and the connection wall portion are formed integrally with each other via extrusion forming.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
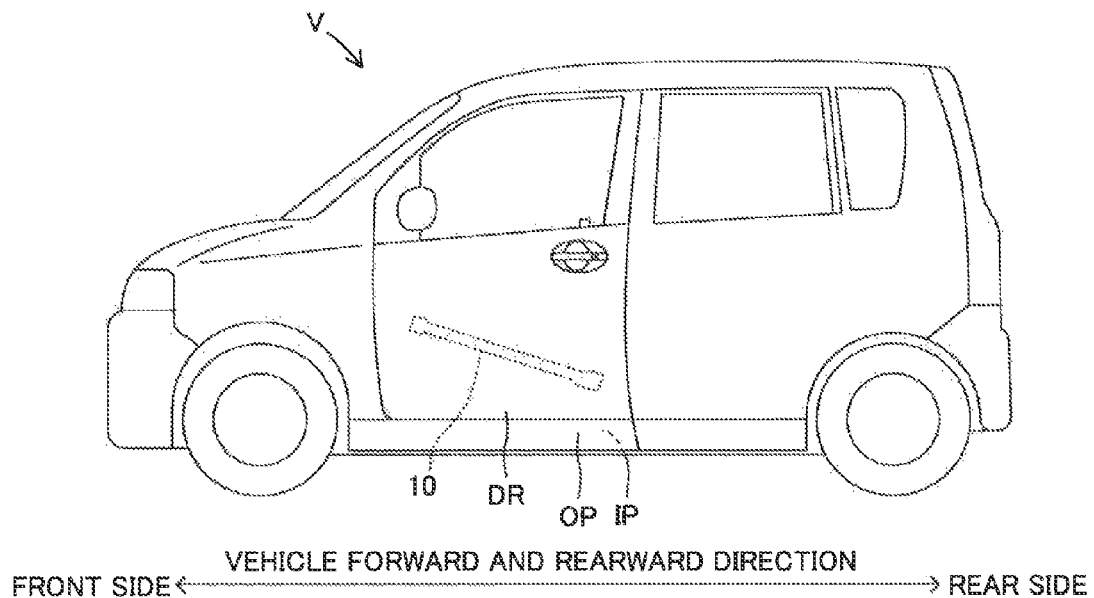
FIG. 1 is a schematic view of a vehicle to which a vehicle door impact beam disclosed here is applied.

Hereinafter, a vehicle door impact beam 10 in an embodiment disclosed here will be described. First, a vehicle V to which the vehicle door impact beam 10 is attached will be schematically described. As illustrated in FIG. 1, a door DR is openably and closably attached to a frame (component that forms the skeleton of a vehicle compartment) of the vehicle V. The vehicle door impact beam 10 in the embodiment disclosed here is attached to the inside of the door DR. The door DR includes an outer panel OP and an inner panel IP as is well known, and the vehicle door impact beam 10 is disposed between the outer panel OP and the inner panel IP. The vehicle door impact beam 10 is tightened to the inner panel IP. In the embodiment disclosed here, the vehicle door impact beam 10 is attached to a left door DR of the vehicle V; however, the vehicle door impact beam 10 disclosed here can be attached to another door.

Figure 2:
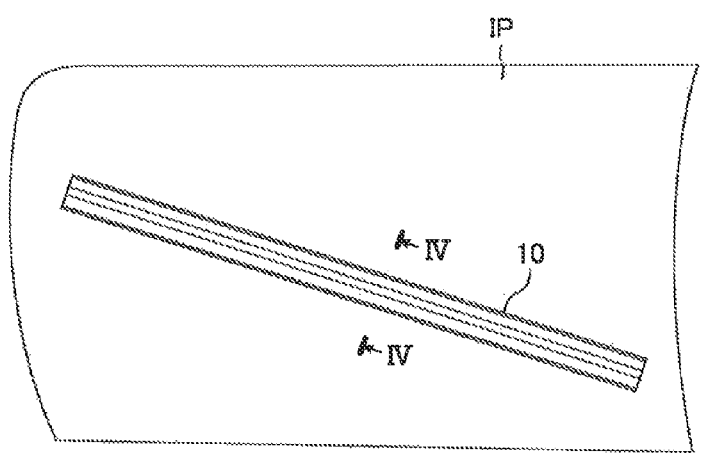
FIG. 2 is an enlarged view of a door portion in FIG. 1.

As illustrated in FIG. 2, the vehicle door impact beam 10 is formed into a long shape, and is provided to extend from a rear end portion to a front end portion of the inner panel IP. The vehicle door impact beam 10 is tightened to the inner panel IP in a state where the vehicle door impact beam 10 is inclined such that a front end side of the vehicle door impact beam 10 is positioned higher than a rear end side of the vehicle door impact beam 10.

Figure 3:
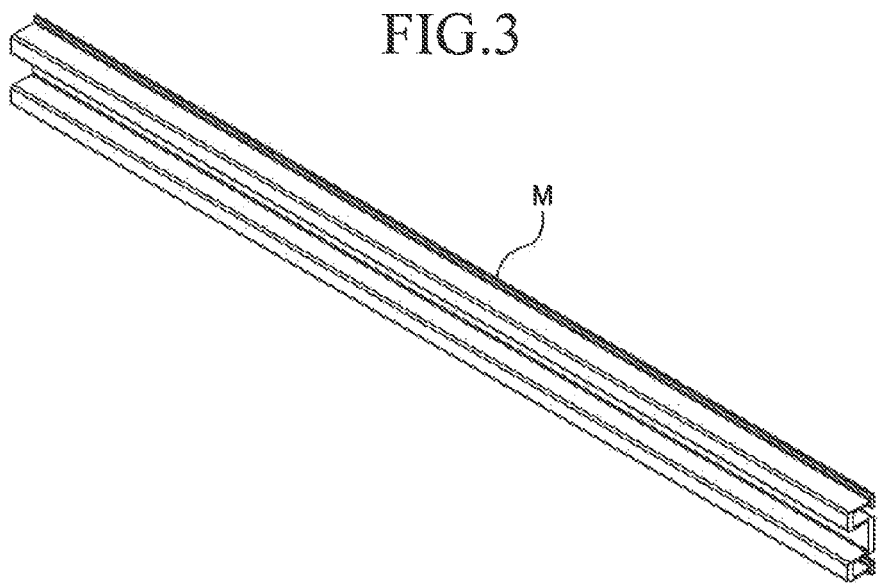
FIG. 3 is a perspective view of an intermediately formed member.

Hereinafter, the configuration of the vehicle door impact beam 10 will be described in detail. The vehicle door impact beam 10 is manufactured by bending an intermediately formed member M (refer to FIG. 3), which has been formed straight by extruding aluminum alloy, along an outside surface (left surface) of the inner panel IP.

Figure 4:
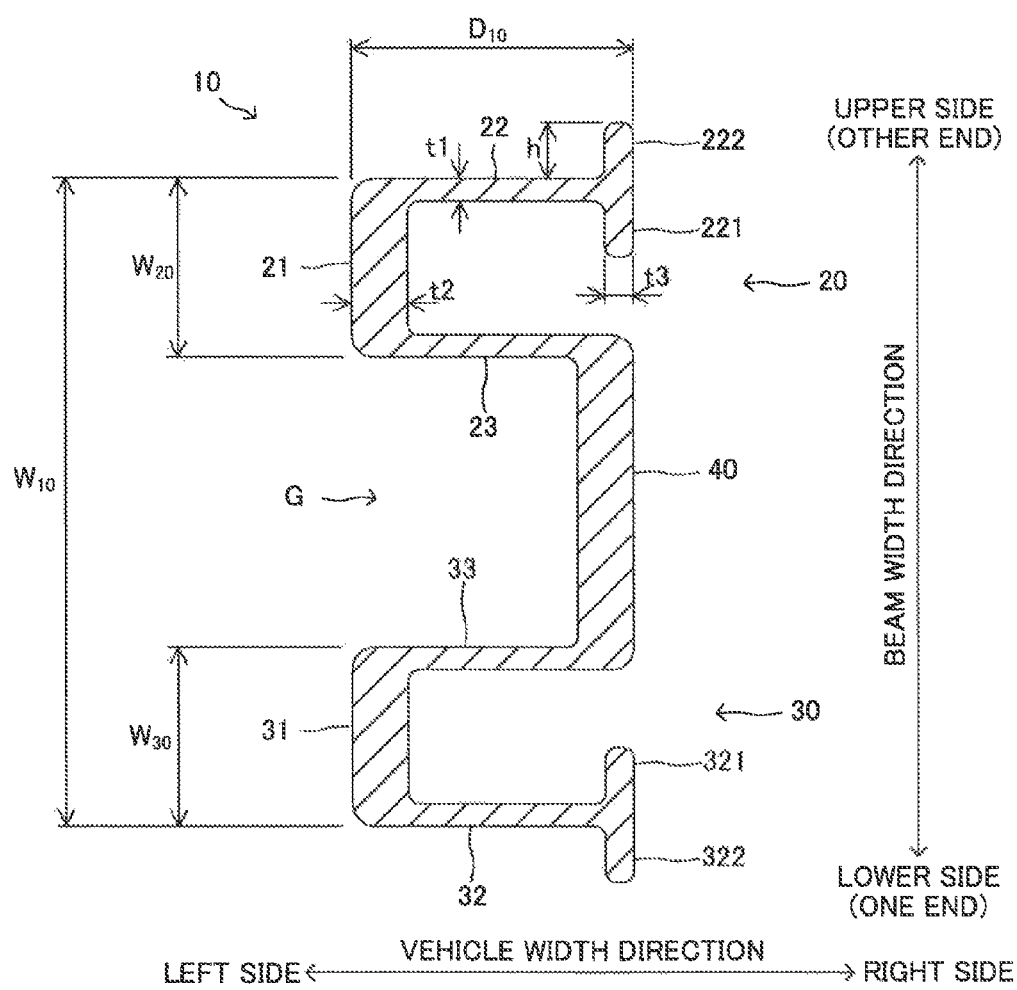
FIG. 4 is a sectional view taken along lines IV-IV in FIGS. 2 and 7.

Hereinafter, the shape of the vehicle door impact beam 10 will be described with reference to FIG. 4. A rightward and leftward direction on the sheet of FIG. 4 is equivalent to a vehicle width direction. As illustrated in FIG. 4, a vehicle compartment side of the vehicle door impact beam 10 is defined as a right side. A vehicle outside of the vehicle door impact beam 10 is defined as a left side. A direction perpendicular to the sheet of FIG. 4 is defined as a longitudinal beam direction. The longitudinal beam direction is perpendicular to a vehicle width direction. A vertical direction on the sheet of FIG. 4, that is, a direction perpendicular to the longitudinal beam direction and the vehicle width direction is defined as a beam width direction. One end side of the vehicle door impact beam 10 in the beam width direction is defined as a lower side. The other end side of the vehicle door impact beam 10 in the beam width direction is defined as an upper side.

As illustrated in FIG. 4, the vehicle door impact beam 10 is formed such that the shape of a section perpendicular to the longitudinal direction of the vehicle door impact beam 10 is an open sectional shape, that is, a sectional shape in which a closed inner space is not formed. The vehicle door impact beam 10 includes a first grooved portion 20 and a second grooved portion 30 which have a groove shape, extend in the longitudinal direction of the vehicle door impact beam 10, and open toward the right side. That is, a depth direction of the first grooved portion 20 and the second grooved portion 30 coincides with the vehicle width direction.

The first grooved portion 20 includes a bottom wall portion 21 and side wall portions 22 and 23. The bottom wall portion 21 is formed into a plate shape which extends in the longitudinal beam direction. A plate thickness direction of the bottom wall portion 21 coincides with the vehicle width direction. A width direction (direction perpendicular to a longitudinal direction of the bottom wall portion 21 and the plate thickness direction of the bottom wall portion 21) of the bottom wall portion 21 coincides with the beam width direction. Each of the side wall portions 22 and 23 is formed into a plate shape which extends toward the right side (vehicle compartment side) from upper and lower end portions of the bottom wall portion 21 in the width direction of the bottom wall portion 21, and extends in the longitudinal beam direction. A plate thickness direction of the side wall portions 22 and 23 coincides with the beam width direction. Protrusions 221 and 222 are formed in a right end portion of the side wall portion 22 such that the protrusions 221 and 222 protrude downward and upward (toward the inside and the outside of a groove (space surrounded by the bottom wall portion 21 and the side wall portions 22 and 23)), and extend in the longitudinal beam direction.

The second grooved portion 30 is positioned below the first grooved portion 20, and is provided to extend in parallel with the first grooved portion 20. The first grooved portion 20 and the second grooved portion 30 are provided at the same position in the vehicle width direction. Similar to the first grooved portion 20, the second grooved portion 30 includes a bottom wall portion 31 and side wall portions 32 and 33. Protrusions 321 and 322 are formed in a right end portion of the side wall portion 32 such that the protrusions 321 and 322 protrude upward and downward (toward the inside and the outside of a groove (space surrounded by the bottom wall portion 31 and the side wall portions 32 and 33)), and extend in the longitudinal beam direction.

Respective right end portions of the side wall portions 23 and 33 are connected to each other via a connection wall portion 40. The connection wall portion 40 is formed into a plate shape which extends in the longitudinal beam direction. A plate thickness direction of the connection wall portion 40 coincides with the vehicle width direction. A grooved portion G is formed by the side wall portion 23, the side wall portion 33, and the connection wall portion 40, extends in the longitudinal direction of the vehicle door impact beam 10, and opens toward the left side. Through holes (not illustrated) are respectively formed in both end portions of the connection wall portion 40 in the longitudinal direction. Similar to a vehicle door impact beam disclosed in Reference 2, nuts (not illustrated) are respectively attached to locations on a left surface of the connection wall portion 40 in which the through holes are formed.

The dimension of the vehicle door impact beam 10 in the longitudinal beam direction is 800 mm. A dimension $W_{10}$ of the vehicle door impact beam 10 in the beam width direction is 56 mm. A dimension $D_{10}$ of the vehicle door impact beam 10 in the vehicle width direction is 25 mm. A dimension $W_{20}$ of the first grooved portion 20 in the beam width direction is 30 mm, and a dimension $W_{30}$ of the second grooved portion 30 in the beam width direction is 17 mm. A plate thickness t1 of each of the side wall portions 22, 23, 32, and 33 is 3 mm. A plate thickness t2 of each of the bottom wall portions 21 and 31 and the connection wall portion 40 is 8 mm. A protrusion height h of each of the protrusions 221, 222, 321, and 322 is 3 mm. A wall thickness t3 of each of the protrusions 221, 222, 321 and 322 is 3 mm. The aforementioned dimension of each of the portions is an example, and can be arbitrarily changed. The plate thickness t2 is set to be larger than the plate thickness t1.

The vehicle door impact beam 10 is fixed to the left surface of the inner panel IP by inserting bolts into the respective through holes from the right side of the inner panel IP (from the vehicle compartment side) and tightening the bolts with the respective nuts. In a state where the vehicle door impact beam 10 is fixed to the inner panel IP, both end portions of the vehicle door impact beam 10 in the longitudinal beam direction are in contact with the inner panel IP, and in contrast, an intermediate portion of the vehicle door impact beam 10 in the longitudinal beam direction is spaced apart from the inner panel IP.

Figure 5:
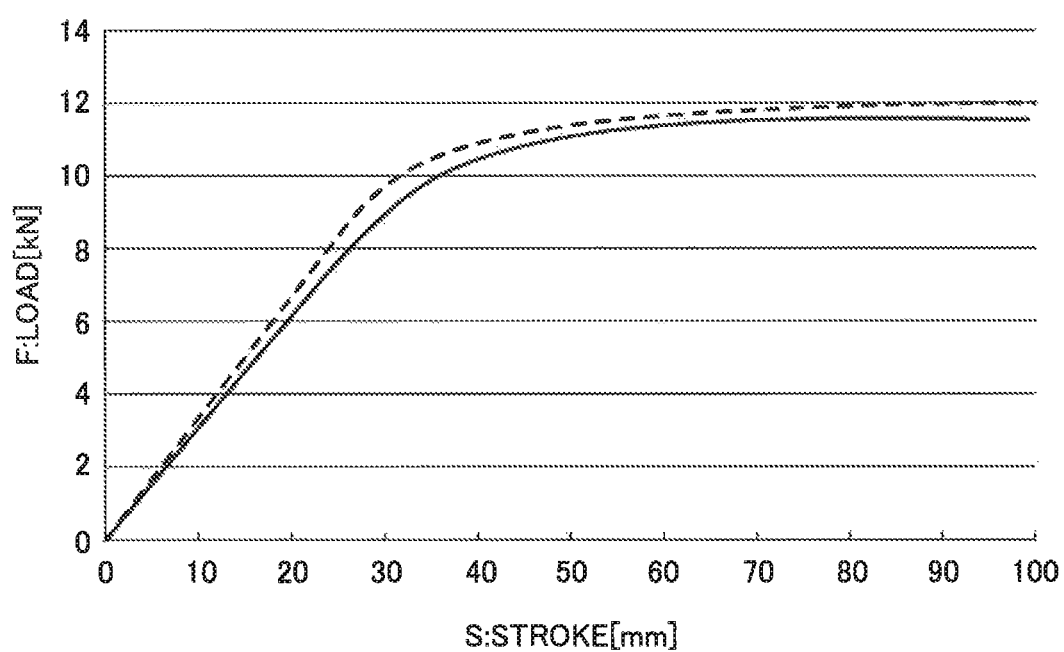
FIG. 5 is a graph illustrating comparison of the bending rigidity of the vehicle door impact beam disclosed here with that of a vehicle door impact beam in the related art.

FIG. 5 illustrates an F-S curve representing a relationship between a load and a stroke when a central portion of the vehicle door impact beam is pressed from the left side to the right side in a state where both end portions of the vehicle door impact beam in the longitudinal beam direction are fixed. In FIG. 5, a characteristic of the vehicle door impact beam 10 in the embodiment is illustrated by a solid line, and a characteristic of the vehicle door impact beams (refer to References 1 and 2) having a cylindrical shape in the related art is illustrated by a dotted line. Since the protrusions 221, 222, 321, and 322 are formed in the vehicle door impact beam 10, each portion of the vehicle door impact beam 10 can be deformed such that the side wall portion 22 and the side wall portion 32 are collapsed toward the inside of the respective grooves. Similar to the vehicle door impact beam disclosed in Reference 3, the vehicle door impact beam 10 opens toward the vehicle compartment side. However, unlike the vehicle door impact beam disclosed in Reference 3, a rapid decrease in load caused by outward opening of the side wall portions 22 and 32 when the intermediate portion is pressed is prevented. As a result, the bending rigidity of the vehicle door impact beam 10 can be set to be the same as that of the vehicle door impact beam having a cylindrical shape in the related art.

Since the vehicle door impact beam 10 is formed to have an open sectional shape, an extrusion speed can be increased to be higher than that in the vehicle door impact beam having a cylindrical shape in the related art. That is, it is possible to more easily extrude a material from a die, in contrast to a case where cylindrical members such as the vehicle door impact beams disclosed in References 1 and 2 are manufactured. For this reason, it is possible to use a material having strength higher than that in the related art. Aluminum alloy used in the related art has a tensile strength of approximately 400 MPa. In contrast, it is possible to adopt aluminum alloy having a tensile strength of approximately 500 MPa for use in the vehicle door impact beam 10.

Since the grooved portion G opens toward the left side (toward an outer panel side), unlike the vehicle door impact beam disclosed in Reference 2, it is not necessary to perform a step of diagonally cutting both end portions of the intermediately formed member M so as to attach the nuts to the left surface of the connection wall portion 40. As a result, it is possible to reduce manufacturing costs.

The respective bottom wall portions 21 and 31 of the first and second grooved portions 20 and 30, and the connection wall portion 40 which have a large influence on the bending rigidity of the vehicle door impact beam 10 are formed to have a thickness larger than that of the side wall portions 22, 23, 32, and 33 which have a small influence on the bending rigidity. As a result, it is possible to reduce the weight of the vehicle door impact beam 10 while maintaining high bending rigidity.

In the vehicle door impact beams disclosed in References 1 and 2, it is necessary to insert a jig (core member) into a cylindrical inside of aluminum alloy so as to prevent the collapse of a sectional shape of the aluminum alloy when an intermediately formed member (formed straight by extruding the aluminum alloy) is bent along the inner panel IP. In this case, it is difficult to pull out the jig after bending is performed. In contrast, in the vehicle door impact beam 10, even if bending is performed in a state where jigs are inserted into the respective grooved portions, thereafter, it is possible to relatively easily remove the jigs.

Figure 6:
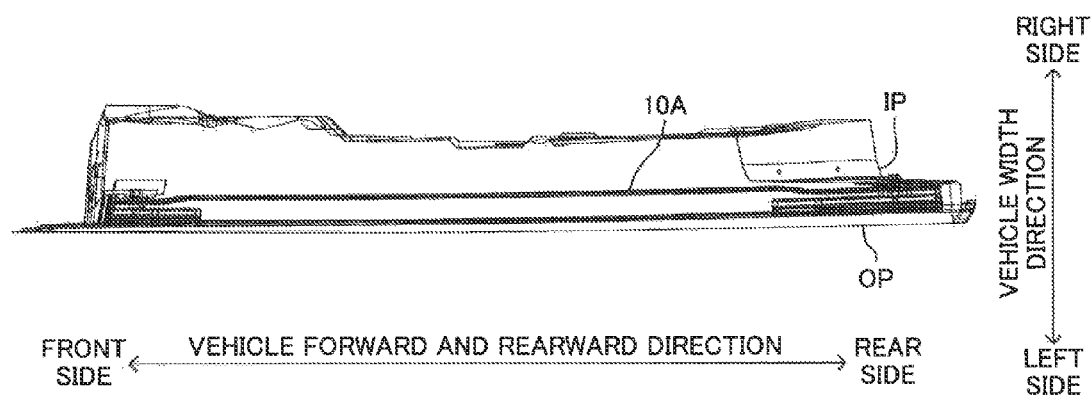
FIG. 6 is a sectional view illustrating a section of a vehicle door to which a vehicle door impact beam in a modification example disclosed here is applied, which is perpendicular to a vertical vehicle direction.

A distance between the inner panel IP and the outer panel OP may be smaller in the front and rear end portions of the vehicle door DR than those in other portions (central portion of the vehicle door) (refer to FIG. 6). For example, In order to avoid interference between a vehicle center pillar and the vehicle door in a state where the vehicle door DR is closed, the rear end portion of the inner panel IP may be bent, and thus, an inner space of the rear end portion of the vehicle door DR may be narrow. In this case, a vehicle door impact beam 10A may be obtained by compressing the front and rear end portions of the vehicle door impact beam 10 in the vehicle width direction. That is, the dimension of front and rear end portions of the vehicle door impact beam 10A in the vehicle width direction is smaller than those of other portions in the vehicle width direction.

Figure 7:
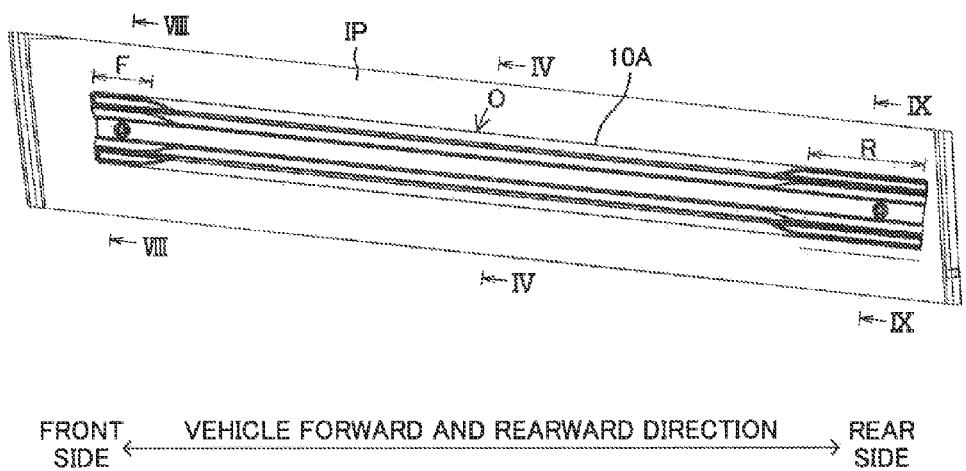
FIG. 7 is a view of the inside of a vehicle door in FIG. 6 viewed from a side (left side)
Figure 8:
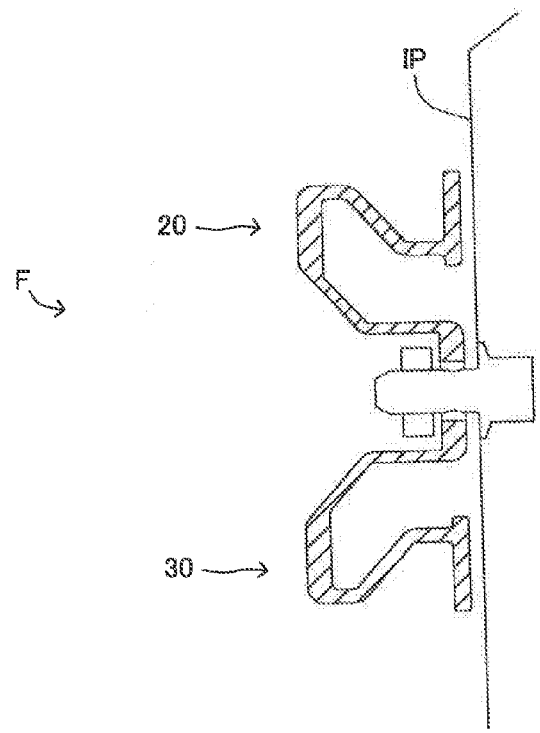
FIG. 8 is a sectional view taken along line VIII-VIII in FIG. 7.
Figure 9:
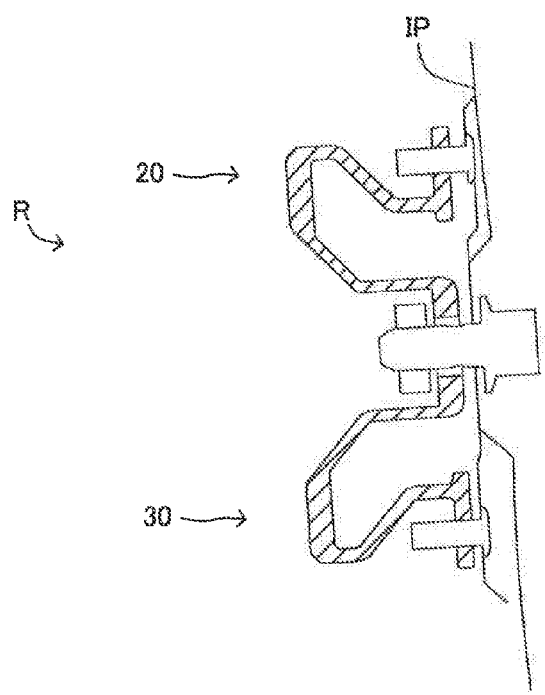
FIG. 9 is a sectional view taken along line IX-IX in FIG. 7.

Specifically, as illustrated in FIGS. 7, 8, and 9, respective bottom portion sides of the first and second grooved portions 20 and 30 are bent such that respective outer panel OP side end portions (that is, respective bottom portion sides of the grooves) of the front end portions of the first and second grooved portions 20 and 30 are spaced apart from each other, and respective outer panel OP side end portions of the rear end portions of the first and second grooved portions 20 and 30 are spaced apart from each other. That is, the front end portions and the rear end portions of both of the first and second grooved portions 20 and 30 are pressed such that an outer panel OP side portion of the first grooved portion 20 is positioned higher than an inner panel IP side portion of the first grooved portion 20, and an outer panel OP side portion of the second grooved portion 30 is positioned lower than an inner panel IP side portion of the second grooved portion 30.

In FIG. 7, a front end portion F and a rear end portion R of the vehicle door impact beam 10A are pressed portions. A section of the front end portion F in a longitudinal direction is uniform regardless of the cutting position of the front end portion F, and has a shape illustrated in FIG. 8. A section of the rear end portion R in the longitudinal direction is uniform regardless of the cutting position of the rear end portion R, and has a shape illustrated in FIG. 9. A sectional shape is gradually changed from the front end portion F toward a rear side. A sectional shape is gradually changed from the rear end portion R toward a front side. A central portion O of the vehicle door impact beam 10A in the longitudinal direction has a sectional shape illustrated in FIG. 4.

The dimension of the front end portion F in the longitudinal direction is 50 mm. In contrast, the dimension of the rear end portion R in the longitudinal direction is 100 mm. The dimension of the front and rear end portions F and R in the vehicle width direction is 30 mm. The dimension of the central portion O in the vehicle width direction is 35 mm.

Figure 15:
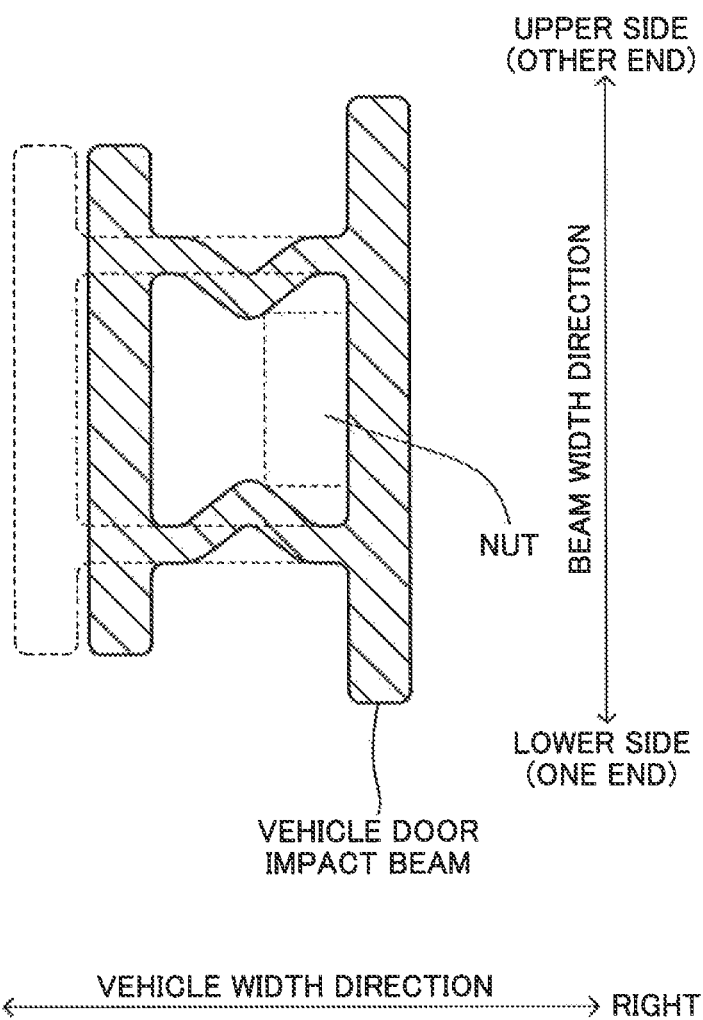
FIG. 15 illustrates a section of an end portion of a vehicle door impact beam formed into a cylindrical shape, and is a sectional view illustrating a section that is formed by compressing the end portion in a vehicle width direction.

As described above, since the end portions (the front and rear end portions F and R) of the vehicle door impact beam 10A in the longitudinal direction have a relatively small dimension in the vehicle width direction, even if an inner space of an end portion of the vehicle door DR is narrow, it is possible to attach the vehicle door impact beam 10A to the vehicle door DR. An outer panel OP side portion of the first grooved portion 20 is positioned higher than an inner panel IP side portion of the first grooved portion 20, and an outer panel OP side portion of the second grooved portion 30 is positioned lower than an inner panel IP side portion of the second grooved portion 30. That is, unlike an example illustrated in FIG. 15, a sufficient space is formed in a portion of the connection wall portion 40 which is positioned on an outer panel OP side. That is, it is possible to ensure a space required to attach nuts to an outer panel OP side surface of the connection wall portion 40.

This disclosure is not limited to the embodiment, and changes can be made to the embodiment in various forms insofar as the changes do not depart from the object of this disclosure.

Figure 10:
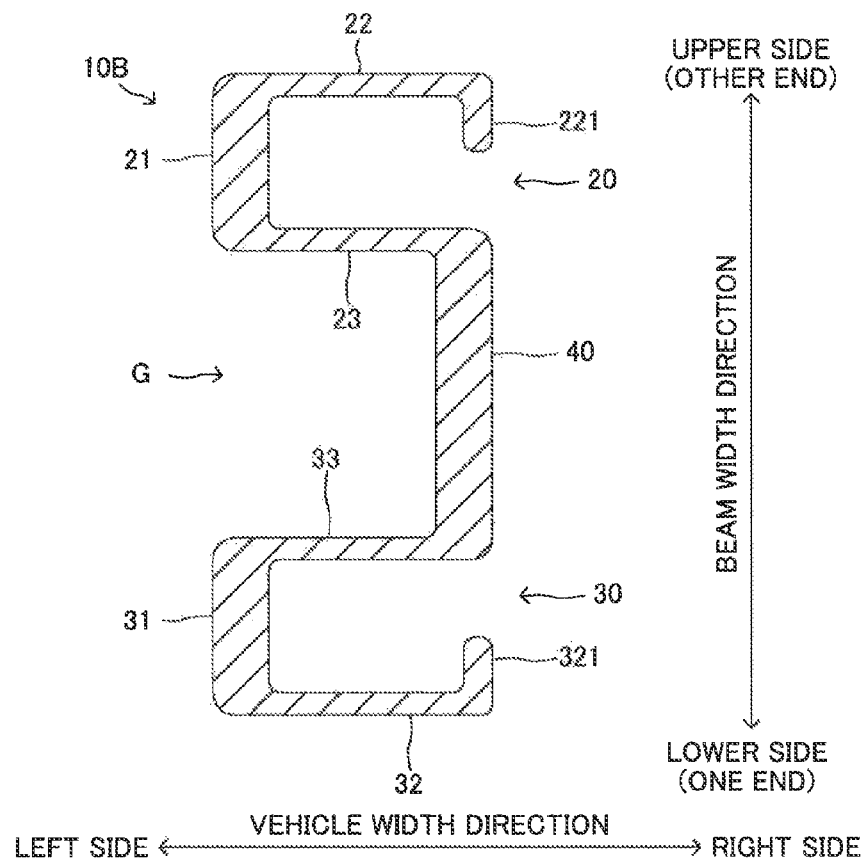
FIG. 10 is a sectional view of a vehicle door impact beam in another modification example disclosed here which is perpendicular to a longitudinal direction of the vehicle door impact beam.
Figure 11:
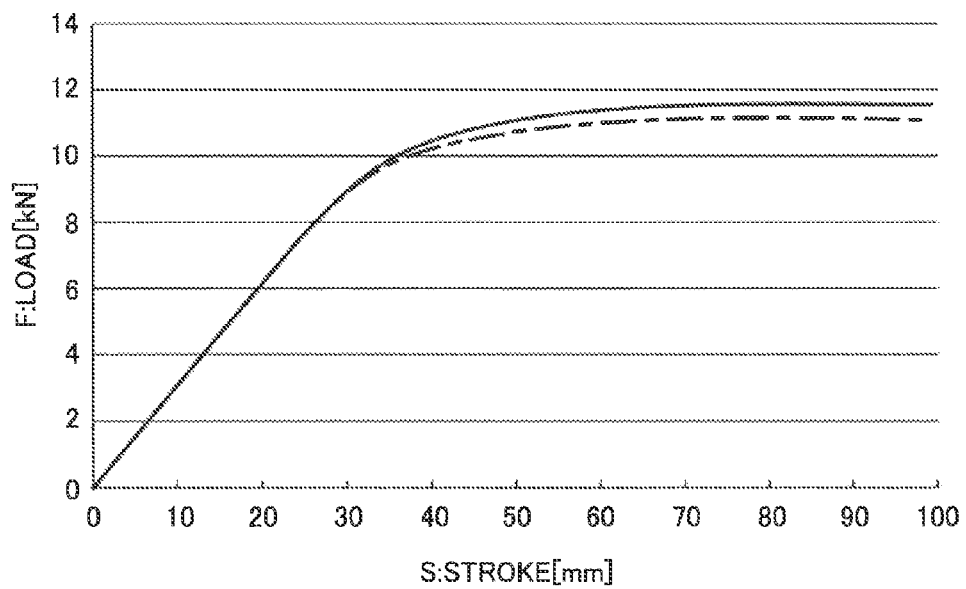
FIG. 11 is a graph illustrating comparison of the bending rigidity of the vehicle door impact beam in FIG. 4 with that of the vehicle door impact beam in FIG. 10.

For example, as illustrated in FIG. 10, the protrusions 222 and 322 may be omitted. As illustrated in FIG. 11, bending rigidity of a vehicle door impact beam 10B having such a configuration is the same as that of the vehicle door impact beam 10 in the embodiment. In FIG. 11, a characteristic of the vehicle door impact beam 10 is illustrated by a solid line, and a characteristic of the vehicle door impact beam 10B is illustrated by a dot-and-dash line.

Figure 12:
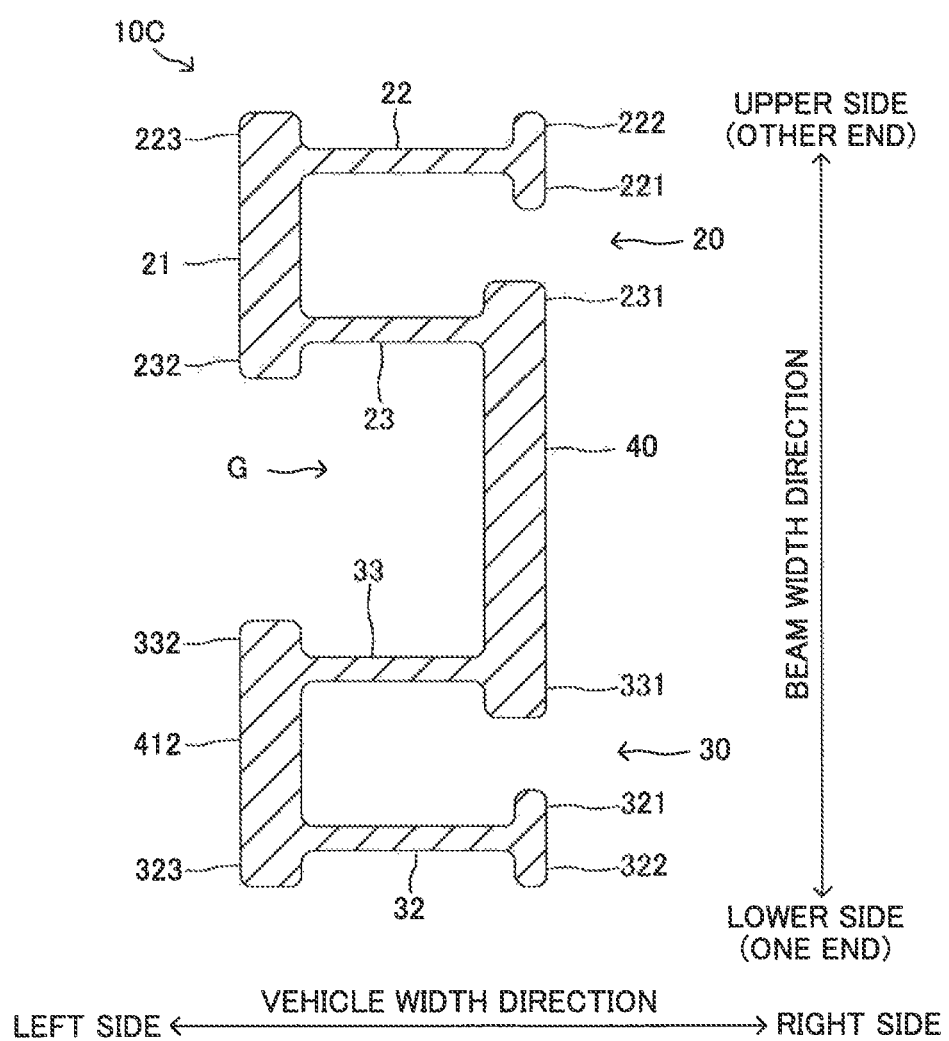
FIG. 12 is a sectional view of a vehicle door impact beam in still another modification example disclosed here which is perpendicular to a longitudinal direction of the vehicle door impact beam.

As illustrated in FIG. 12, a vehicle door impact beam 10C in which protrusions 223, 231, 232, 323, 331, and 332 are further provided may be adopted. The protrusion 223 is provided in a left end portion of the side wall portion 22 in such a way as to protrude upward and to extend in the longitudinal beam direction. The protrusion 231 is provided in a right end portion of the side wall portion 23 in such a way as to protrude upward and to extend in the longitudinal beam direction. The protrusion 232 is provided in a left end portion of the side wall portion 23 in such a way as to protrude downward and to extend in the longitudinal beam direction. The protrusion 323 is provided in a left end portion of the side wall portion 32 in such a way as to protrude downward and to extend in the longitudinal beam direction. The protrusion 331 is provided in a right end portion of the side wall portion 33 in such a way as to protrude downward and to extend in the longitudinal beam direction. The protrusion 332 is provided in a left end portion of the side wall portion 33 in such a way as to protrude upward and to extend in the longitudinal beam direction. A protrusion height of each of the protrusions 223, 231, 232, 323, 331, and 332 is the same as that of the protrusions 221 and 222. A plate thickness of each of the protrusions 223, 231, 232, 323, 331, and 332 is the same as that of the bottom wall portions 21 and 31, or that of the connection wall portion 40. In FIG. 12, any one or multiple protrusions of the protrusions 222, 223, 231, 232, 322, 323, 331, and 332 may be omitted.

Figure 13:
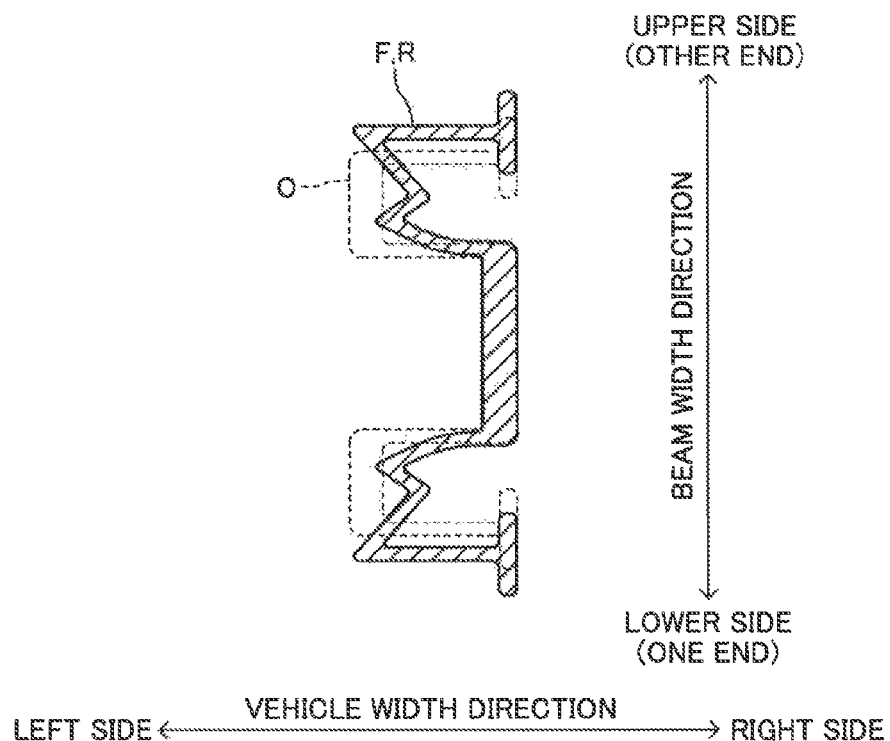
FIG. 13 is a sectional view illustrating another example shape of the sections taken along lines VIII-VIII and IX-IX in FIG. 7.
Figure 14:
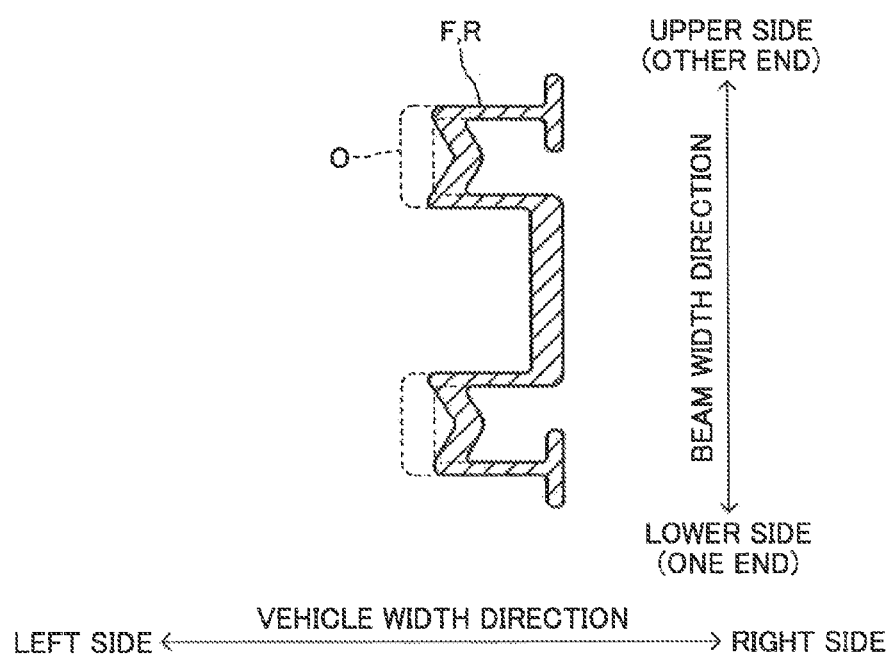
FIG. 14 is a sectional view illustrating still another example shape of the sections taken along lines VIII-VIII and IX-IX in FIG. 7.

The front and rear end portions F and R may have sectional shapes illustrated in FIGS. 13 and 14. As illustrated in FIG. 13, the dimension of either the front or rear end portion F or R or both of the front and rear end portions F and R in the beam width direction may be larger than the dimension of the central portion O in the beam width direction.

A feature of an aspect of this disclosure resides in a vehicle door impact beam (10, 10A, 10B, 10C) that is disposed between a first door panel (OP) and a second door panel (IP) of a door (DR) of a vehicle (V), the impact beam including: a first grooved portion (20) configured to include a bottom wall portion (21) which extends along the first door panel in a predetermined direction, and a pair of side wall portions (22, 23) which are respectively connected to both end portions of the bottom wall portion in a width direction, and extend in the predetermined direction, and configured to open toward a second door panel side; a second grooved portion (30) that is disposed a predetermined gap away from the first grooved portion in the width direction, is configured to include a bottom wall portion (31) which extends along the first door panel in the predetermined direction, and a pair of side wall portions (32, 33) which are respectively connected to both end portions of the bottom wall portion in the width direction, and extend in the predetermined direction, and is configured to open toward the second door panel; and a connection wall portion (40) configured to connect one side wall portion (23), which is one of the pair of side wall portions of the first grooved portion and is positioned on a second grooved portion side, to one side wall portion (33) which is one of the pair of side wall portions of the second grooved portion and is positioned on a first grooved portion side, and configured to extend along the second door panel in the predetermined direction. The first grooved portion includes a protrusion (221) that protrudes toward the inside of the first grooved portion from a second door panel side end portion of the other side wall portion (22) of the pair of side wall portions, and that extends in the predetermined direction. The second grooved portion includes a protrusion (321) that protrudes toward the inside of the second grooved portion from a second door panel side end portion of the other side wall portion of the pair of side wall portions, and that extends in the predetermined direction. The first grooved portion, the second grooved portion, and the connection wall portion are formed integrally with each other via extrusion forming.

In this case, the first grooved portion may include a protrusion (222) that protrudes toward the outside of the first grooved portion from another second door panel side end portion of the other side wall portion of the pair of side wall portions, and that extends in the predetermined direction. The second grooved portion may include a protrusion (322) that protrudes toward the outside of the second grooved portion from another second door panel side end portion of the other side wall portion of the pair of side wall portions, and that extends in the predetermined direction.

In this case, the protrusion formed on the inside of the first grooved portion may have the same protrusion height as that of the protrusion formed on the outside of the first grooved portion. The protrusion formed on the inside of the second grooved portion may have the same protrusion height as that of the protrusion formed on the outside of the second grooved portion.

Since the aforementioned protrusions are formed in the vehicle door impact beam, each portion of the vehicle door impact beam can be deformed such that the respective side wall portions of the first grooved portion and the second grooved portion are collapsed toward the inside (the inside of a space surrounded by the bottom wall portion and the side wall portions) of the respective grooves. Similar to a vehicle door impact beam disclosed in Reference 3, the vehicle door impact beam opens toward a vehicle compartment side. However, unlike the vehicle door impact beam disclosed in Reference 3, a rapid decrease in load caused by outward opening of the side wall portions when an intermediate portion in the longitudinal direction is pressed is prevented. As a result, the bending rigidity of the vehicle door impact beam can be set to be the same as that of the vehicle door impact beam having a cylindrical shape in the related art.

In this configuration, the shape of a section perpendicular to the longitudinal direction of the vehicle door impact beam is an open sectional shape, that is, a sectional shape in which a closed inner space is not formed. Accordingly, an extrusion speed can be increased to a speed higher than that in the vehicle door impact beam having a cylindrical shape in the related art. That is, it is possible to more easily extrude a material from a die, in contrast to a case where cylindrical members such as the vehicle door impact beams disclosed in References 1 and 2 are manufactured. For this reason, it is possible to use a material having strength higher than that in the related art. Unlike the vehicle door impact beam disclosed in Reference 2, it is not necessary to perform a step of diagonally cutting both end portions of an intermediately formed member so as to attach nuts to a first door panel side surface of the connection wall portion. As a result, it is possible to reduce manufacturing costs.

Another feature of the aspect of this disclosure resides in that, in the vehicle door impact beam, the bottom wall portion of the first grooved portion is formed to have a thickness larger than that of the side wall portions of the first grooved portion, the bottom wall portion of the second grooved portion is formed to have a thickness larger than that of the side wall portions of the second grooved portion, and the connection wall portion is formed to have a thickness larger than those of the respective side wall portions of the first grooved portion and the second grooved portion.

In the aspect of this disclosure with this configuration, the respective bottom wall portions of the first grooved portion and the second grooved portion, and the connection wall portion, which have a large influence on the bending rigidity of the vehicle door impact beam are formed to have a thickness larger than that of the side wall portions which have a small influence on the bending rigidity. In this configuration, it is possible to reduce the weight of the vehicle door impact beam while maintaining high bending rigidity.

Still another feature of the aspect of this disclosure resides in that, in the vehicle door impact beam, respective end portions of the first grooved portion and the second grooved portion in a longitudinal direction have groove depths larger than those of respective central portions of the first grooved portion and the second grooved portion in the longitudinal direction.

With this configuration, since the end portions of the vehicle door impact beam in the longitudinal direction have a relatively small dimension in a vehicle width direction, even if an inner space of an end portion of a vehicle door is narrow, it is possible to attach the vehicle door impact beam to the vehicle door.

Yet another feature of the aspect of this disclosure resides in that, in the vehicle door impact beam, a first door panel side portion of the end portion of the first grooved portion is positioned higher than a second door panel side portion of the end portion of the first grooved portion, and a first door panel side portion of the end portion of the second grooved portion is positioned lower than a second door panel side portion of the end portion of the second grooved portion. Accordingly, unlike an example illustrated in FIG. 15, a sufficient space is formed in a portion of the connection wall portion which is positioned on the first door panel side. That is, it is possible to ensure a space required to attach nuts to the first door panel side surface of the connection wall portion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door impact beam that is disposed between a first door panel and a second door panel of a door of a vehicle, the impact beam comprising:

a first grooved portion configured to include a bottom wall portion which extends along the first door panel in a predetermined direction, and a pair of side wall portions which are respectively connected to both end portions of the bottom wall portion in a width direction, and extend in the predetermined direction, and configured to open toward a second door panel side;

a second grooved portion that is disposed a predetermined gap away from the first grooved portion in the width direction, is configured to include a bottom wall portion which extends along the first door panel in the predetermined direction, and a pair of side wall portions which are respectively connected to both end portions of the bottom wall portion in the width direction, and extend in the predetermined direction, and is configured to open toward the second door panel; and a connection wall portion configured to connect one side wall portion, which is one of the pair of side wall portions of the first grooved portion and is positioned on a second grooved portion side, to one side wall portion which is one of the pair of side wall portions of the second grooved portion and is positioned on a first grooved portion side, and configured to extend along the second door panel in the predetermined direction, wherein the first grooved portion includes a protrusion that protrudes toward an inside of the first grooved portion from a second door panel side end portion of the other side wall portion of the pair of side wall portions, and that extends in the predetermined direction, wherein the second grooved portion includes a protrusion that protrudes toward an inside of the second grooved portion from a second door panel side end portion of the other side wall portion of the pair of side wall portions, and that extends in the predetermined direction, wherein the first grooved portion, the second grooved portion, and the connection wall portion are formed integrally with each other via extrusion forming, wherein the first grooved portion includes a protrusion that protrudes toward an outside of the first grooved portion from another second door panel side end portion of the other side wall portion of the pair of side wall portions, and that extends in the predetermined direction, and wherein the second grooved portion includes a protrusion that protrudes toward an outside of the second grooved portion from another second door panel side end portion of the other side wall portion of the pair of side wall portions, and that extends in the predetermined direction.

2. The vehicle door impact beam according to claim 1, wherein the protrusion formed towards the inside of the first grooved portion has the same protrusion height as that of the protrusion formed towards the outside of the first grooved portion, and wherein the protrusion formed towards the inside of the second grooved portion has the same protrusion height as that of the protrusion formed towards the outside of the second grooved portion.

3. The vehicle door impact beam according to claim 1, wherein the bottom wall portion of the first grooved portion is formed to have a thickness larger than that of the side wall portions of the first grooved portion, wherein the bottom wall portion of the second grooved portion is formed to have a thickness larger than that of the side wall portions of the second grooved portion, and wherein the connection wall portion is formed to have a thickness larger than those of the respective side wall portions of the first grooved portion and the second grooved portion.

4. The vehicle door impact beam according to claim 1, wherein respective end portions of the first grooved portion and the second grooved portion in a longitudinal direction have groove depths larger than those of respective central portions of the first grooved portion and the second grooved portion in the longitudinal direction.

5. The vehicle door impact beam according to claim 4, wherein a first door panel side portion of the end portion of the first grooved portion is positioned higher than a second door panel side portion of the end portion of the first grooved portion, and wherein a first door panel side portion of the end portion of the second grooved portion is positioned lower than a second door panel side portion of the end portion of the second grooved portion.

* * * * *